United States Patent [19]

Narbus

[11] 4,218,716
[45] Aug. 19, 1980

[54] PROGRAMMABLE FAULT DETECTING RELAY FOR A TRANSFORMER

[75] Inventor: Joseph J. Narbus, Lindenwold, N.J.

[73] Assignee: General Electric Company, N.Y.

[21] Appl. No.: 842,289

[22] Filed: Oct. 14, 1977

[51] Int. Cl.² .............................................. H02H 7/04
[52] U.S. Cl. ..................................... 361/37; 361/110
[58] Field of Search ................... 361/37, 36, 35, 110, 361/111, 178, 27, 25, 24, 31, 94, 198; 73/708, 709, 712, 717, 720, 721, 723, 726, 753, 754; 324/61, 65; 340/611, 614, 626, 646

[56] References Cited

U.S. PATENT DOCUMENTS

| | | | |
|---|---|---|---|
| 3,417,296 | 12/1968 | Wallentowitz | 361/198 |
| 3,449,633 | 6/1969 | Fischer et al. | 361/37 |
| 3,558,978 | 1/1971 | Nye, Jr. et al. | 361/31 X |
| 3,567,966 | 3/1971 | Gilbert et al. | 361/110 X |
| 3,634,839 | 1/1972 | Vassil et al. | 361/110 X |
| 3,748,656 | 7/1973 | Gray et al. | 340/626 |
| 3,821,605 | 6/1974 | Pendrak | 361/37 |
| 3,855,503 | 12/1974 | Ristuccia | 361/37 |
| 3,914,667 | 10/1975 | Waldron | 361/110 X |
| 4,003,370 | 1/1977 | Emil et al. | 73/753 X |
| 4,028,736 | 6/1977 | Willson et al. | 361/27 |
| 4,051,467 | 9/1977 | Galvin | 340/611 |

Primary Examiner—Patrick R. Salce
Attorney, Agent, or Firm—Francis X. Doyle; Richard A. Menally

[57] ABSTRACT

A programmable fault detecting relay for fluid cooled electrical apparatus utilizes a pressure transducer to provide an electrical input to an electronic discriminating circuit. The circuit discriminates between through fault pressures and internal fault pressures and provides an output upon the occurrence of an internal pressure fault.

5 Claims, 11 Drawing Figures

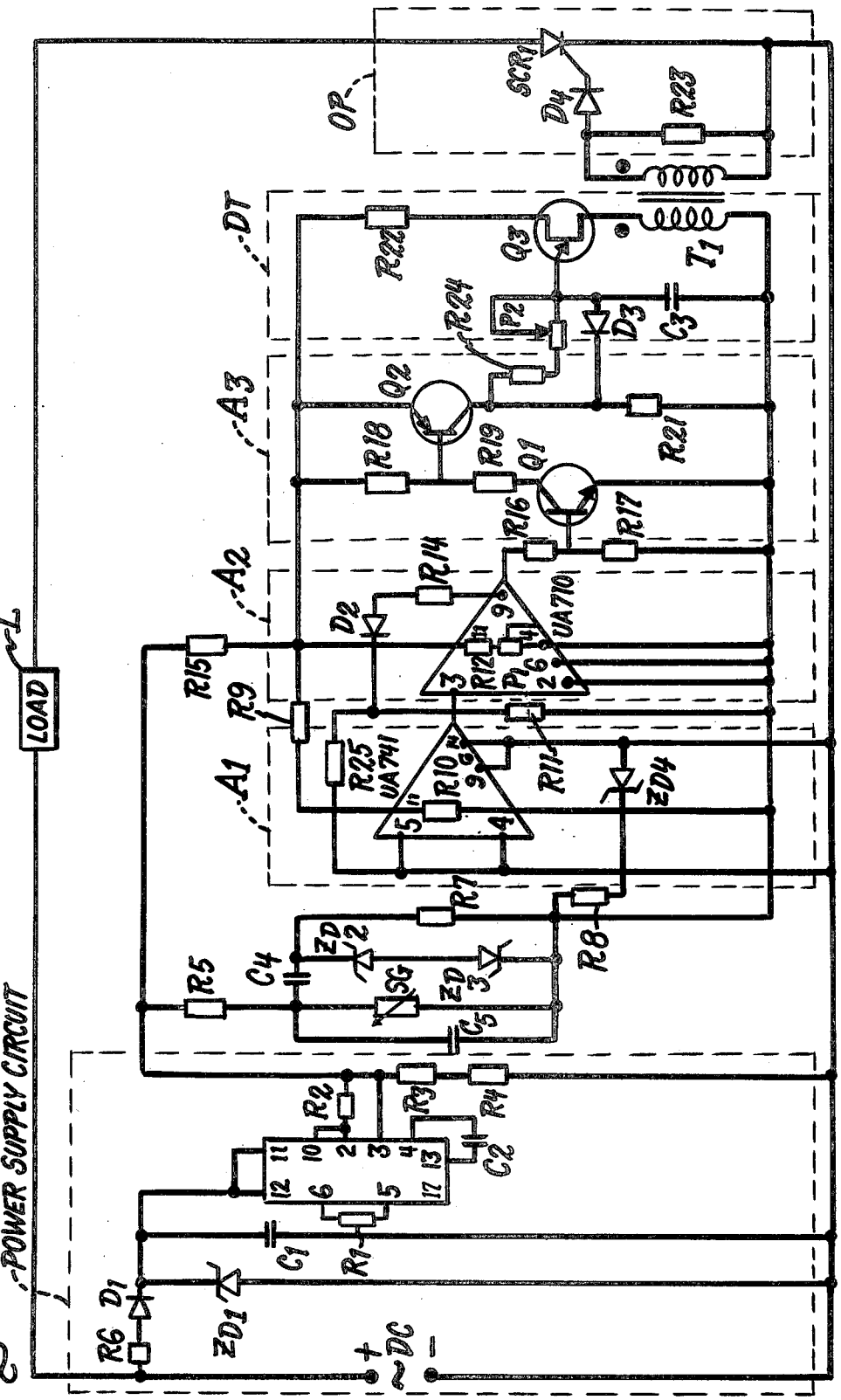

PROGRAMMABLE FAULT DETECTING RELAY FOR A TRANSFORMER

BACKGROUND OF THE INVENTION

This invention relates to apparatus and processes for sensing pressure changes within transformer fluids caused by internal faults. Upon the occurrence of an internally generated transformer fault, a relay can be energized for disconnecting the transformer from the power source to protect the transformer from excessive damage.

Transformers of the type enclosed in a dielectric fluid are subject to damage arising from faults occurring internally within the transformer and causing the transformer fluid to increase in both pressure and temperature. If the transformer is allowed to continue to operate under the fault conditions, the transformer becomes destroyed. Since the transformer internal gas and liquid pressure increases in relation to the amount of energy generated by the internal fault, means are currently available to sense the pressure increase and to operate a relay to remove electrical power from the transformer.

Other conditions which cause the transformer fluid pressure to increase are faults which occur outside the transformer (through faults) and pressure which is generated by seismic or other mechanical disturbances to the transformer fluid. Mechanical type sensing and control devices are currently employed to sense the pressure increase within the transformer fluid and to energize a relay to electrically disconnect the transformer from the power source before catastrophic damage occurs. Mechanical type pressure sensing means and relay assemblages are unable to accurately differentiate between internal faults and through faults. Attempts to increase the sensitivity of the mechanical type pressure sensing elements to internal fault detection quite often cause the transformer to become disconnected from the line when pressure increases are of a temporary nondestructive type through fault. Attempts to over-compensate the mechanical sensing element to allow temporary through fault pressure increases to occur without tripping can also allow internal faults to escape detection which can be destructive to the transformer.

The purpose of this invention is to provide a programmable fault detecting relay for transformers which can differentiate between pressure increases caused by temporary through faults and mechanical disturbances. The fault detecting relay of this invention therefore is able to operate signal and relay equipment for disconnecting the transformer from the line when internal faults occur and to allow the transformer to remain connected to the line for the duration of pressure increases caused by temporary through faults and mechanical disturbances.

SUMMARY OF INVENTION

The invention consists of a method for detecting faults which occur both within a transformer and external to the transformer and for discriminating between a serious internal fault and a temporary through fault for disconnecting the transformer from the line when the fault occurrence is of the internal-generated type. The invention provides means for detecting pressure increases within the transformer fluid and further provides a pressure threshold and a time delay whereby a thyristor is caused to gate when the magnitude of the pressure remains greater than the threshold for a period of time longer than the time delay.

The invention further comprises the combination of a transducer pressure sensing device and a discriminating circuit for analyzing the output of the transducer and gating the output stage of the relay by means of a programmable solid state circuit.

The discriminating circuit further includes a level sensor and delay timer which is caused to become energized when the transducer senses a pressure in excess of a threshold pressure. The delay timer continues to run and functions to gate the thyristor if the transducer continues to sense a pressure in excess of threshold at the end of the delay period.

BRIEF DESCRIPTION OF THE DRAWINGS

FIG. 11 is a detailed circuit diagram for the programmable relay of this invention.

DESCRIPTION OF THE PREFERRED EMBODIMENT

Figure 1:
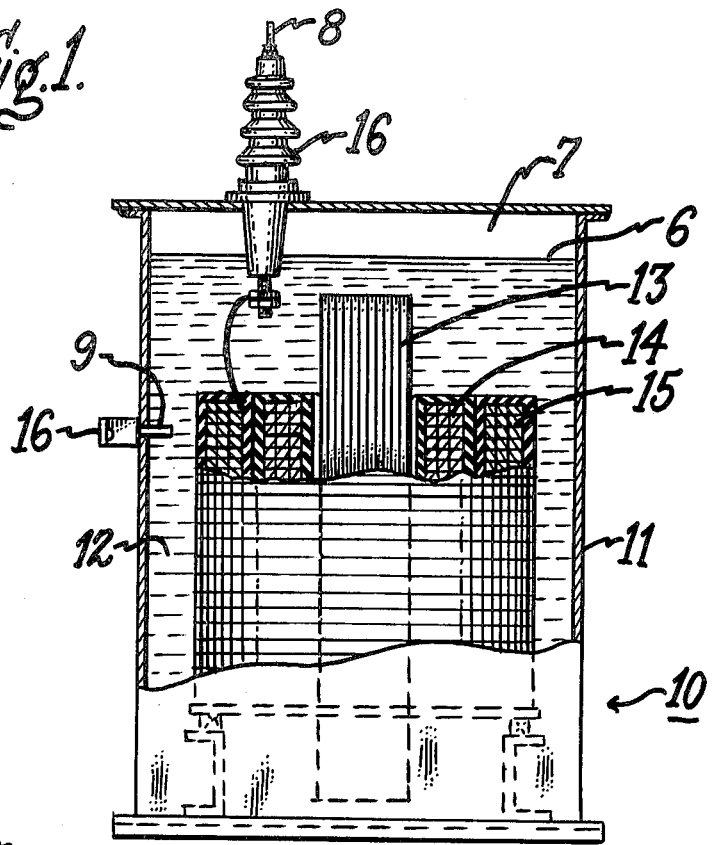
FIG. 1 is a cut-away perspective view of an oil-filled transformer employing the relay of this invention.

FIG. 1 is a transformer 10 of the type having a tank 11 filled with a dielectric fluid 12 and housing at least one core 13 and primary and secondary windings (14,15) in magnetic proximity to the core 13. Electrical connection to the primary leads is made by means of input lead 8 having an insulated bushing 16 to prevent high voltage breakdown from occurring between the input lead 8 and the tank 11. The fault detecting relay 16 attached to the outside of the tank 11 contains a pressure sensing control circuit. The fault detecting relay 16 also contains a pressure sensitive transducer 9 for contacting with the transformer fluid 12 and for generating a voltage response in proportion to the pressure exerted by the transformer oil 12 upon the transducer.

Figure 2:
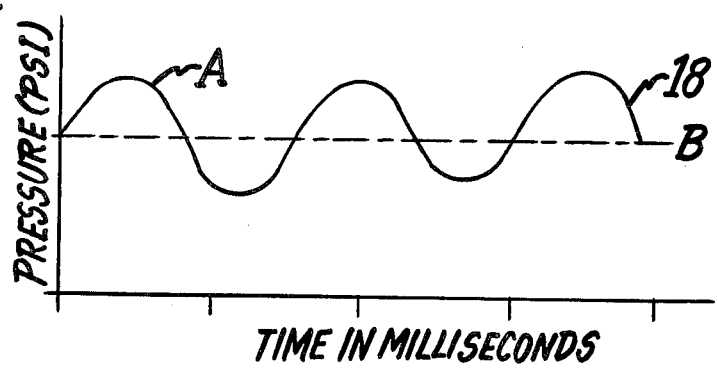
FIG. 2 is a graphic representation of the through fault pressure within the transformer of FIG. 1 as a function of time.

FIG. 2 shows one type of a pressure wave form 18 generated within the fluid 12 by means of a through fault occurring external to the transformer 10 and producing the through fault pressure wave form 18 having a sinusoidal variation as indicated. The through fault pressure wave form 18 has a maximum pressure A relative to the head pressure B but only the maximum pressure A varies sinusoidally as a function of time. The pressure generated by means of a through fault does not generally produce catastrophic failure to the transformer so that the transformer should remain operative and not be disconnected from the line when the pressure is caused to increase solely under the influence of a through fault occurrence.

Figure 3:
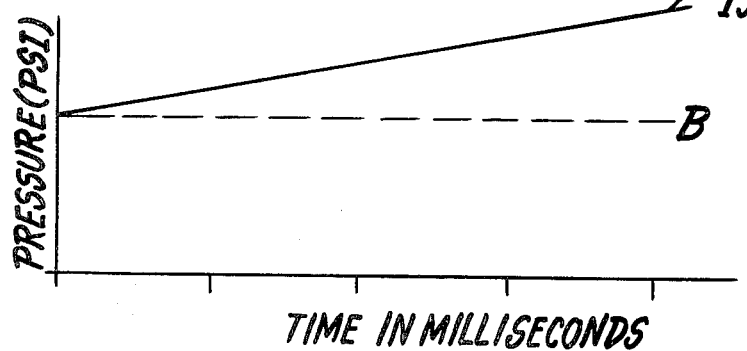
FIG. 3 is a graphic representation of the internal fault pressure within the transformer of FIG. 1 as a function of time.
Figure 4:
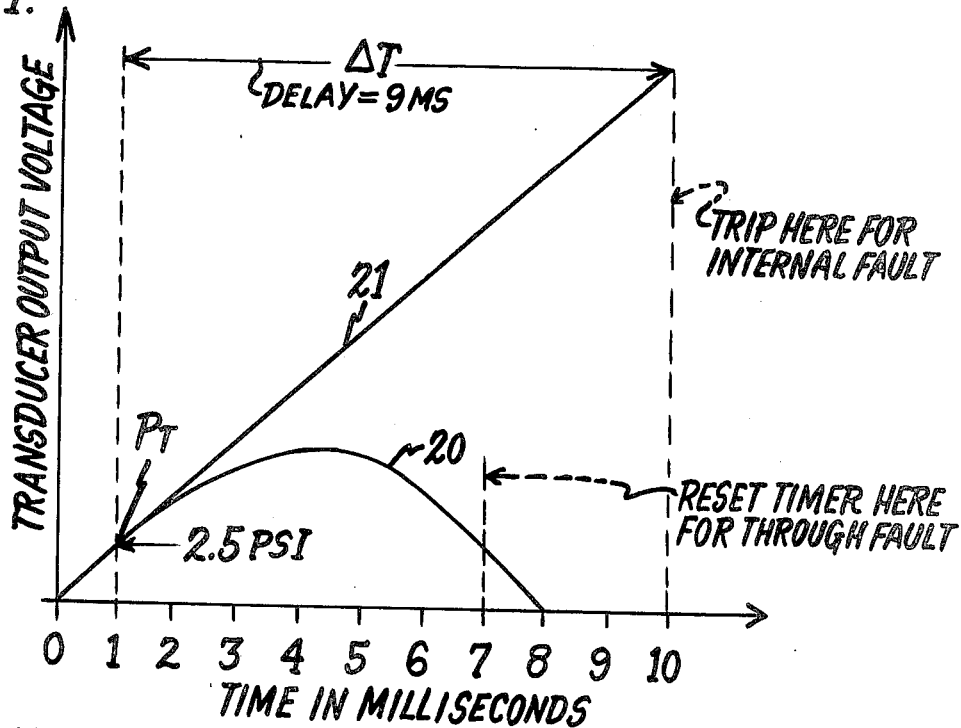
FIG. 4 is a graphic representation of the voltage response within the relay of FIG. 1 as a function of time for both internal fault and through fault pressures.

FIG. 3 shows another type of a pressure wave form 19 generated by an internal fault. The internal fault pressure wave 19 increases continuously with time relative to the head pressure B which remains relatively constant. The internal fault pressure wave form 19 results from a fault occurring within the transformer 10 itself and if the transformer 10 is allowed to continue to operate the pressure can rapidly increase to a point where the transformer 10 can actually explode. The fault detecting relay 16 of FIG. 1 must therefor discriminate between the through fault pressure and the internal fault pressure in order to provide an output only upon the occurrence of an internal fault pressure. Electric arcs caused by internal faults contribute to the increase in gas and oil pressure due to the decomposition and vaporization of the oil by the electric arc. If the transformer 10 is not electrically disconnected from the line, the arc can continue to vaporize the transformer oil 12 to a sufficient pressure to cause the transformer 10 to explode as described earlier. The pressure sensing transducer 9 mounted at the end of the fault detecting relay 16 of FIG. 1 consists of a semiconductor strain transducer mounted on a diaphragm for communicating directly with the transformer oil 12. The transducer 9 produces an electrical output which is proportional to the oil pressure in the transformer 10. Although a semiconductor strain gauge is used for the embodiment of this invention, other types of transducers that will produce a voltage proportional to the oil pressure such as piezoelectric elements and quartz crystals can also be employed. The voltage response for the transducer for both internal faults 21 and through faults 20 are shown in FIG. 4. The through fault pressure voltage response 20 is found to vary in the same manner as described earlier for the through fault pressure wave form 18 of FIG. 2. The internal fault pressure voltage 21 continually increases with time whereas the through fault pressure voltage 20 varies sinusoidally.

Figure 5:
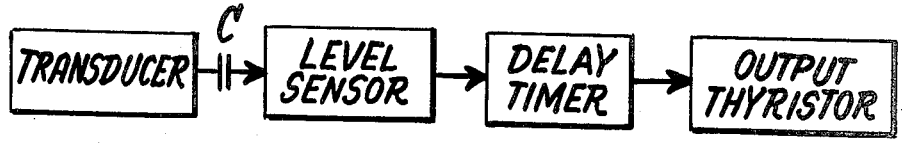
FIG. 5 is a block diagram of a relay circuit for one embodiment of this invention.

FIG. 5 is a block diagram of one embodiment of the programmable relay of this invention. The output from the transducer is connected by means of a capacitor C to a level sensor circuit and the output of the level sensor circuit is connected to a delay timer circuit. The output from the delay timer circuit is used to gate a thyristor which in turn can be used to cause auxiliary equipment to operate.

The operation of the circuit of FIG. 5 is shown in FIG. 4. When the pressure 21 exceeds a preset threshold value $P_T$ which is programmable, the output of the level sensor triggers the delay timer. If the pressure 21 remains above the threshold $P_T$ for the delay period $\Delta T$, then, at the end of the delay period $\Delta T$, the delay timer will gate the output thyristor.

FIG. 4 shows the response of this system to both an internal fault 21 and a through fault 20. For the purpose of illustration, FIG. 4 depicts a realistic case in which the threshold pressure $P_T$ has been set at 2.5 PSI and the delay $\Delta T$, has been set at 9 MS. When the internal fault pressure 21 reaches the threshold $P_T$ of 2.5 PSI at T=1 MS, the delay timer is triggered. Since the pressure 21 remains above the threshold $P_T$ for the entire delay period $\Delta T$ of 9 MS, the delay timer gates the output thyristor at the end of the delay period (T=10 MS). The delay timer is also triggered when the through fault pressure 20 reaches the threshold $P_T$ of 2.5 PSI at T=1 MS. However, the timer stops running and is reset at T=7 MS when the pressure 20 drops below the threshold $P_T$. In this case, the delay timer does not gate the output thyristor.

Figure 7:
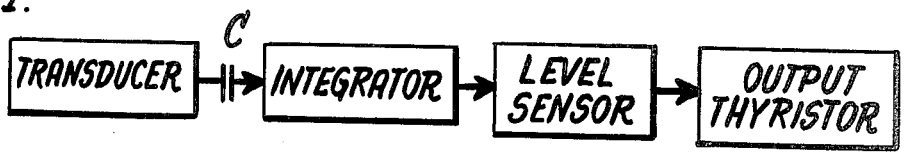
FIG. 7 is a block diagram of a relay circuit for another embodiment of this invention.
Figure 8:
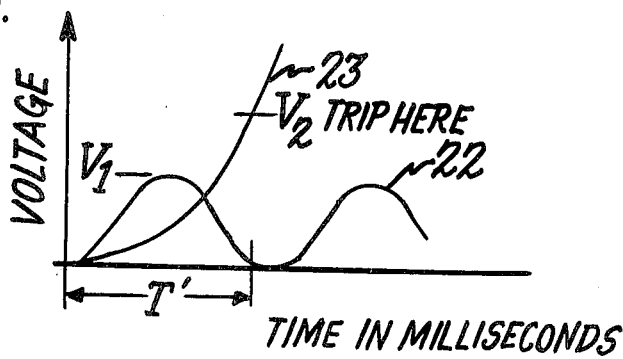
FIG. 8 is a graphic representation of the voltage response within the relay circuit of FIG. 7.

FIG. 7 is an alternate embodiment of the programmable fault detecting relay of this invention where the transducer output is electrically coupled through a capacitor C to an integrator circuit and the output of the integrator circuit is connected to a level sensor circuit. The output of the level sensor circuit is used to gate the thyristor for the purposes as described earlier for the embodiment of FIG. 5. In this embodiment the transducer output voltage is integrated over a period of time T' and the level of this integrated voltage is sensed by the level sensor circuit. The level sensor circuit is designed to gate the thyristor when the integrated voltage value equals a threshold value. The integrated voltage value as a function of time for the circuit of FIG. 7 is shown in FIG. 8. The integrated through fault voltage 22 from the transducer caused by the sinusoidal through fault pressure variation at time T' is less than the integrated internal fault voltage 23 at the same T'. In order to prevent the thyristor from becoming gated by through fault pressure variations 22 the level sensor circuit is designed to gate the thyristor at a voltage $V_2$ which is higher than the peak voltage $V_1$ generated by any through fault pressure oscillation.

Figure 9:
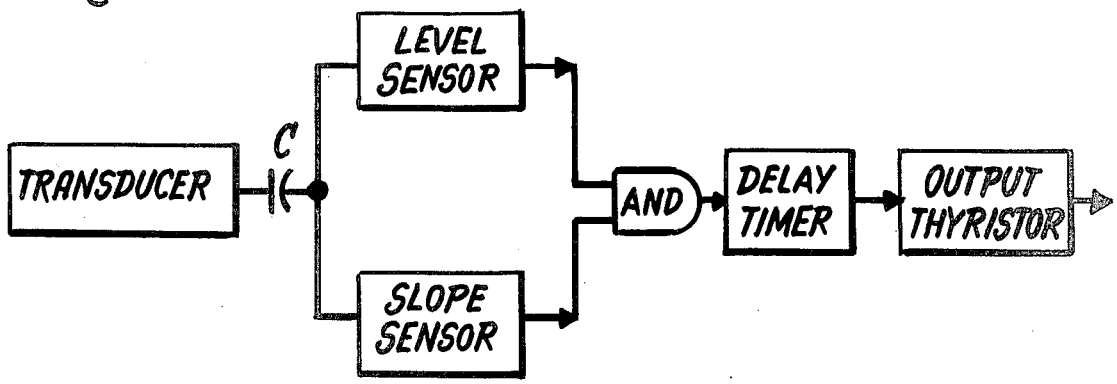
FIG. 9 is a block diagram of a relay circuit for a further embodiment of this invention.

An alternate embodiment of the relay of this invention is shown in FIG. 9 where the output from the transducer is electrically coupled by a capacitor C to both a level sensor and a slope sensor and the output of both the level sensor and slope sensor are connected to the input of an "and" gate. The output of the "and" gate is coupled with a delay timer and the output of the delay timer is connected to gate the output thyristor.

Figure 10:
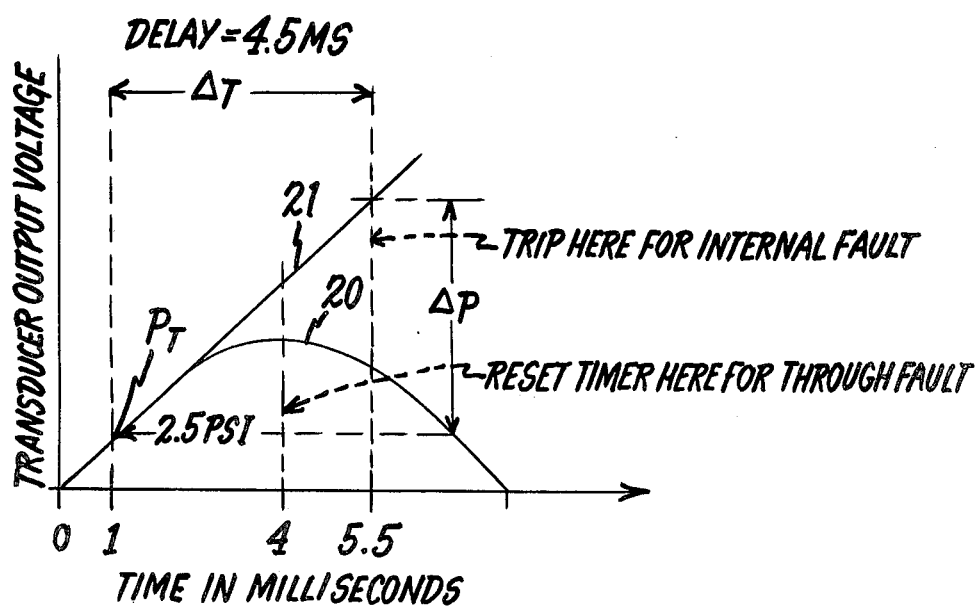
FIG. 10 is a graphic representation of the voltage response within the relay circuit of FIG. 9.

The operation of the circuit of FIG. 9 is shown in FIG. 10. When the pressure 21 exceeds a preset threshold value $P_T$, which is programmable, and, the slope of the pressure waveform $\Delta P/\Delta T$ is positive, the delay timer is triggered. If the pressure 21 remains above the threshold $P_T$, and the slope $\Delta P/\Delta T$ remains positive during the delay period $\Delta T$, then at the end of the delay period, the delay timer will gate the output thyristor.

FIG. 10 shows the response of this system to both an internal fault 21 and a through fault 20. For the purpose of illustration FIG. 10 depicts a realistic case in which the threshold pressure $P_T$ has been set at 2.5 PSI and the delay period $\Delta T$ has been set for 4.5 MS. Since the slope $\Delta P/\Delta T$ of the internal pressure waveform 21 is positive, the delay timer is triggered when the threshold pressure $P_T$ of 2.5 PSI is reached at T=1 MS. The slope of the pressure waveform $\Delta P/\Delta T$ remains positive and the magnitude of the pressure waveform 21 remains above the threshold for the entire delay period of 4.5 MS. Therefore, at the end of the delay period (T=5.5 MS), the output stage of the relay is gated. Since the initial slope $\Delta P/\Delta T$ of the through fault pressure waveform 20 is also positive, the delay timer is triggered when the pressure 20 reaches the threshold $P_T$ of 2.5 PSI at T=1 MS. However, the timer stops running, and resets slightly after T=4 MS where the slope of the pressure waveform $\Delta P/\Delta T$ goes negative. Since the timer stops running before the delay period $\Delta T$ of 4.5 MS has expired, the output stage does not become gated.

Figure 6:
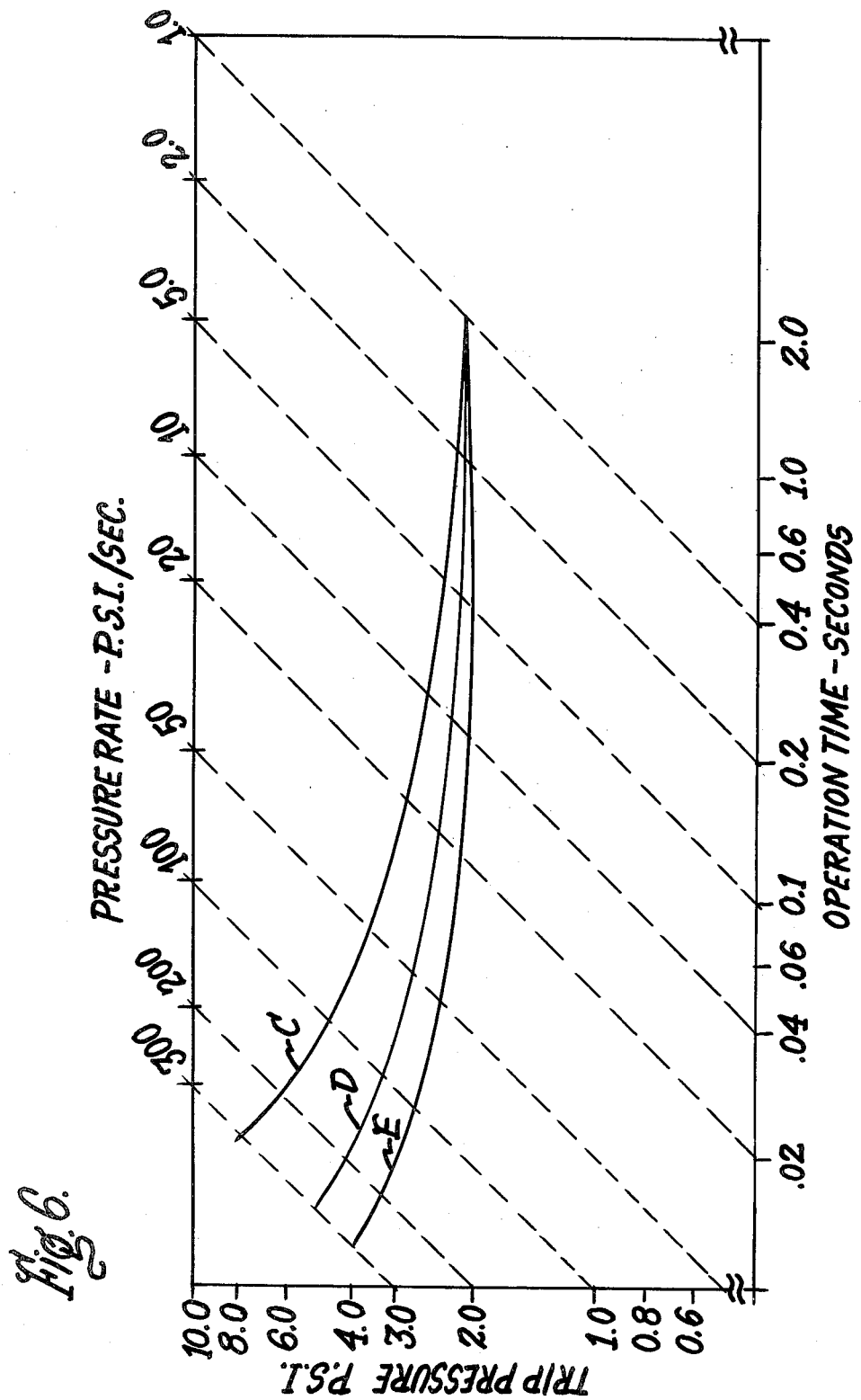
FIG. 6 is a graphic representation of each of the responses for the three embodiments of this invention.

FIG. 6 shows the operating characteristics for the embodiments of FIGS. 5, 7, and 9 wherein the trip pressure is plotted as a function of operating time for contours of pressure rates. It is to be noted that the trip pressures of curve C for the embodiment of FIG. 7 is higher than the trip pressures of curves D and E for the embodiments of FIGS. 5 and 9 respectively for operating times less than approximately 0.40 seconds. For operating times in excess of 0.40 seconds all three embodiments have approximately equal trip pressures.

The circuit of FIG. 7 is described as follows. The pressure transducer, as described earlier, is a semiconductor strain gauge that produces a voltage in proportion to the applied pressure. The transducer output is fed to a solid state operational amplifier connected to function as an integrator, the integrator output is fed to a level sensor circuit which basically consists of another operational amplifier connected to function as a voltage comparator with an adjustable reference for programmability. The output from the level sensor is used to gate the output thyristor.

The circuit for the embodiment of FIG. 5 is as follows. The transducer element is similar to that described earlier for the embodiment of FIG. 7 and the output from the transducer is connected to the level sensor circuit which is a first solid state operational amplifier connected to function as a voltage comparator with an adjustable reference for programmability. The output from the level sensor is fed to the delay timer which consists of a standard unijunction transistor timing circuit which is adjustable for programmability. The output of the delay timer is connected in the same manner as the embodiment of FIG. 7 to gate the output thyristor.

The circuit for the embodiment of FIG. 9 comprises a transducer the output of which is coupled to the inputs of a level sensor and a slope sensor by means of capacitor C. The slope sensor consists of a solid state operation amplifier connected to function as a differentiator and the level sensor consists of a solid operational amplifier connected to function as a voltage comparator. The output of both the level sensor and slope sensor circuits are coupled to the input of a standard "and" gate which provides an output when both the level sensor and slope sensor output are positive. The output of the "and" gate is connected to a delay timer which is a unijunction transistor delay timer circuit operating in a similar manner as described for the outputs of FIGS. 5 and 7.

The transducer 9 for the relay 16 within transformer 10 of FIG. 1 is situated beneath the level of the transformer oil 12. In regions where seismic disturbances can be troublesome, the height of the transducer 9 below the surface of the transformer oil 12 determines whether pressure waves generated by the seismic disturbance can have an effect of the discriminating properties of the programmable fault detecting relay of this invention. Since the pressure generated during a seismic disturbance is proportional to the depth below the free surface 8 of the oil 12, the transducer 9 should be mounted relatively close to the transformer oil surface 8 in order to reduce the amount of seismic pressure sensed by the transducer 9 to a negligible level. The transducer 9 for the programmable relay 16 of this invention can also be mounted above the oil surface 8 and can sense the pressure variations existing in the gas space 7. When the programmable relay of this invention is mounted in the gas space 7, that is, above the oil surface 8, the discrimination between through pressure faults and internal generated faults is less critical. The pressure in the gas space 7 is relatively unaffected by a through fault and is not affected to any great degree by a seismic type disturbance.

Although the programmable fault detecting relay of this invention is described for application with oil-filled transformers, this is by way of example only. The relay of this invention finds application wherever any electrical apparatus is to be contained within a closed space subject to pressure variations which are internally generated and which can lead to the failure of the electrical apparatus involved.

I claim:
1. A programmable fault detecting relay for a transformer comprising;
   transducer means for producing an output voltage in proportion to a pressure generated within the transformer;
   at least one operational amplifier connected to function as a voltage comparator and coupled with the transducer for sensing the voltage level generated by the transducer and comparing said level to a threshold for producing an output when said threshold is reached;
   at least one unijunction transistor in an RC charging circuit coupled with an output of the operational amplifier and at least one variable resistor coupled with the transistor for providing adjustable time delay to the RC circuit for providing a time delay period between the time at which the threshold is first reached and a later time; and at least one thyristor coupled with the transistor for providing an output at the end of the delay period.

2. The relay of claim 1 wherein the transducer means is capacitively coupled to the level sensing means.

3. A programmable fault detecting relay for a transformer of the type employing cooling oil within a housing comprising:
   transducer means submersed proximate a top surface of said oil to reduce pressure effects caused by mechanical forces and communicating with said oil for providing an output voltage in response to oil pressure increases within the transformer;
   a first operational amplifier coupled with the transducer and connected to function as a voltage comparator for sensing the transducer voltage and comparing the voltage to a threshold for producing an output when the threshold is reached;
   at least one second operational amplifier connected to function as a differentiator coupled with the transducer for determining a derivative of the transducer voltage and for producing an output when the derivative is positive;
   and AND gate having a pair of inputs one of said inputs coupled with an output from said first operational amplifier and the other of said inputs coupled with an output from said second operational amplifier for providing an output signal when the derivative is positive and the voltage remains above the threshold;
   at least one unijunction transistor coupled with the output of the AND gate and connected in an RC charging circuit with at least one variable resistor for providing an adjustable time delay to the RC circuit, when the voltage reaches the threshold and the derivative is positive for producing an output at the end of said delay period; and
   at lease one thyristor for providing an output at the end of the delay period when the derivative remains positive and the voltage remains above threshold during the delay period.

4. The relay of claim 3 wherein the transducer is capacitively coupled to the level sensing circuit and the slope sensing circuit.

5. The relay of claim 3 wherein the transducer is located in a space above the oil.

* * * * *